INVENTOR
MARTIN J. COHEN

BY *Raphael Semmes*

ATTORNEY

Sept. 1, 1970　　　　　M. J. COHEN　　　　　3,526,137
SAMPLING APPARATUS FOR USE WITH CHEMICAL PROCESSES AND THE LIKE
Filed Feb. 3, 1969　　　　　　　　　　　　2 Sheets-Sheet 2

INVENTOR
MARTIN J. COHEN

BY *Raphael Semmes*

ATTORNEY

United States Patent Office 3,526,137
Patented Sept. 1, 1970

3,526,137
SAMPLING APPARATUS FOR USE WITH CHEMICAL PROCESSES AND THE LIKE
Martin J. Cohen, West Palm Beach, Fla., assignor to Franklin Gno Corporation, West Palm Beach, Fla., a corporation of Florida
Filed Feb. 3, 1969, Ser. No. 796,004
Int. Cl. G01n 1/10
U.S. Cl. 73—422       2 Claims

ABSTRACT OF THE DISCLOSURE

A sample is obtained by repetitively oscillating an open-ended chamber between alignment with one of a pair of pipes and alignment with the other of the pair of pipes. The chamber is formed in a member and the ends of the chamber are closed as the chamber moves between the pipes. The member is supported by a closely fitting guide which allows the chamber to open and close as the chamber oscillates between the pipes.

BACKGROUND OF THE INVENTION

This invention relates to sampling apparatus and methods and more particularly is concerned with the provision of diluted samples of corrosive or antagonistic materials which may deteriorate an instrument to which the samples are presented for analysis.

One of the principal problems confronting those concerned with the analysis of materials in production processes, for example, is the corrosion and destruction of the sensor head of an analytic instrument which is continually exposed to severe operating conditions. Under laboratory conditions, the problem can be solved by any one of several available techniques. However, when an attempt is made in the field to connect a laboratory instrument to a sample source continually, even when the sensor is specially prepared for the connection, it is found that varnishes, tars, dust, soot, acids, and other contaminating and corroding agents rapidly deteriorate the performance of the instrument, so that the instrument must be removed frequently for servicing and renewal of the parts which are exposed to the sample material.

The copending application of Martin J. Cohen, David I. Carroll, Roger F. Wernlund, and Wallace D. Kilpatrick, Ser. No. 777,964, filed Oct. 23, 1968 and entitled "Apparatus and Methods for Separating, Concentrating, Detecting, and Measuring Trace Gases," discloses highly sensitive "Plasma Chromatography" systems involving the formation of primary ions and reaction of the primary ions with molecules of trace substances to form secondary ions, which may be concentrated, separated, detected, and measured by virtue of the difference of velocity or mobility of the ions in an electric field. The sensitivity of such instruments is so great that it is practical to trade off a portion of the available sensitivity in exchange for the dilution of the corrosive and antagonistic elements which deteriorate the analyzing instrument.

BRIEF DESCRIPTION OF THE INVENTION

It is accordingly a principal object of the present invention to provide apparatus and methods for extracting a sample from a sample source and for diluting the sample before it is presented to an instrument for analysis.

Briefly stated, preferred embodiments of the apparatus and methods of the invention employ a sampling mechanism which extracts a predetermined sample volume from a sample source, such as a pipe in which a liquid or gaseous sample is under pressure, and which inserts the extracted volume into a receiver, such as a pipe to which a diluent gas is applied under pressure. The predetermined sample volume is swept into a mixing chamber, where it may be further diluted by additional diluent gas, and the diluted sample is then applied to an instrument, such as a Plasma Chromatograph, for analysis or measurement. Provision may also be made for cleaning the sampling mechanism by a cleansing gas, to reduce the effects of corrosive samples.

BRIEF DESCRIPTION OF THE DRAWINGS

The invention will be further described in conjunction with the accompanying drawings, which illustrate preferred and exemplary embodiments, and wherein.

DETAILED DESCRIPTION OF THE INVENTION

Figure 1:
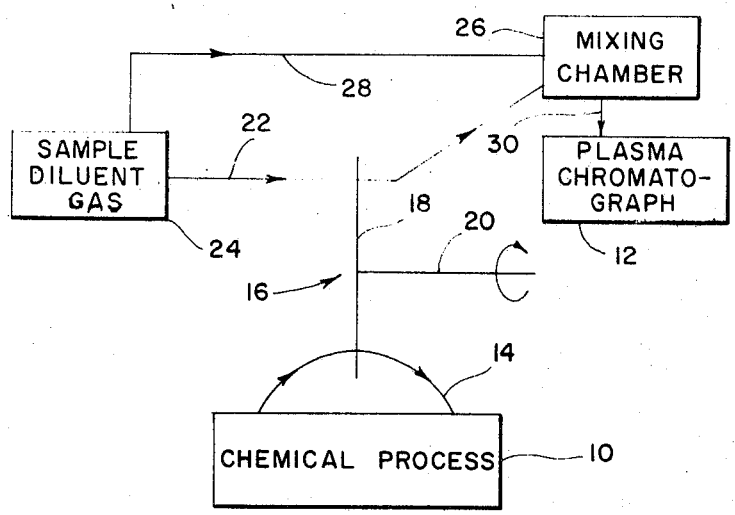
FIG. 1 is a combined block and structural diagram illustrating a system to which a first form of sampling mechanism in accordance with the invention is applied.

Referring to the drawings, and initially to FIG. 1, the principles of the invention may be applied to the measurement or analysis of a sample extracted from a chemical process symbolized by block 10, an analyzing instrument being represented by block 12. Although a Plasma Chromatograph is shown, it is to be understood that any analyzing or measuring instrument appropriate to the sample and having adequate sensitivity may be employed. In the form shown, the source of sample comprises a pipe 14 to which a liquid or gaseous sample is applied under pressure from the chemical process 10, so that if the pipe is uninterrupted the sample will flow therein. The sampling mechanism, generally designated by reference numeral 16, may comprise a disc or wheel 18 which rotates with a shaft 20 upon suitable bearings and is driven by a suitable motor (not shown). As will be seen hereinafter, the disc extracts a sample from pipe 14 and inserts it into a sample receiver, such as pipe 22, to which a sample diluent gas (or liquid) is applied under pressure from a source 24. The diluent gas flowing through pipe 22 sweeps the sample into a mixing chamber 26 when pipe 22 is uninterrupted. Diluent gas is also applied to the mixing chamber through a separate pipe 28 connecting the gas source 24 to the mixing chamber 26. Diluted sample from the mixing chamber is applied to the analyzing instrument 12 by pipe 30, the diluent gas pressure serving to convey the diluted sample to the instrument if desired.

Figure 2:
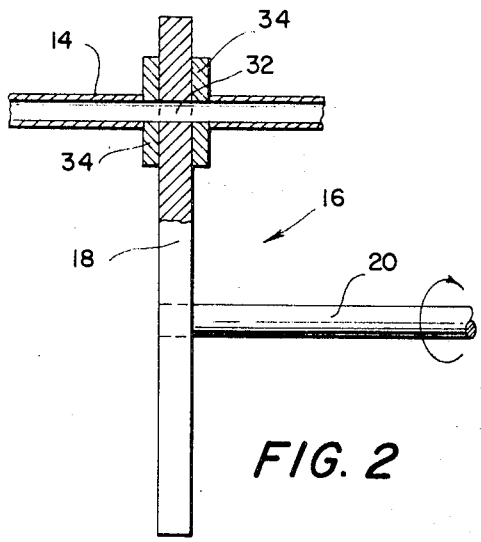
FIG. 2 is a partially sectional side elevation view illustrating the sampling mechanism of FIG. 1 in greater detail.
Figure 3:
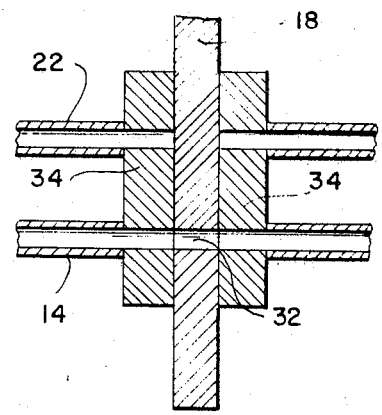
FIG. 3 is a partially sectional plan view further illustrating the sampling mechanism.
Figure 4:
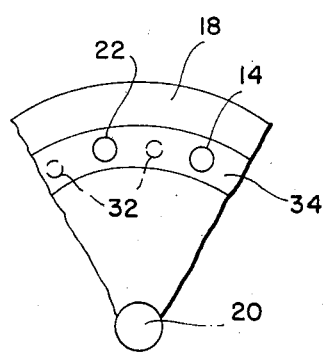
FIG. 4 is a fragmentary end elevation view of a portion of the sampling mechanism.

Referring now to FIGS. 2-4, disc 18 is seen to intersect pipe 14 so that a constant volume chamber 32 in the disc may be aligned with and actually form a part of pipe 14. Arcuate pressure pads 34, preferably spring biased against opposite sides of disc 18, form a seal which prevents leakage of fluid from the chamber 32 or the pipes 14 and 22. As shown in FIG. 3, the disc 18 also intersects pipe 22, and the pressure pads 34 extend between pipes 14 and 22 and beyond. If the disc 18 is rotated from the position illustrated in FIGS. 2 and 3, constant volume chamber 32 may be brought into alignment with and become a portion of pipe 22. In the position shown in FIGS. 2 and 3, pipe 22 is interrupted or blocked by the disc, so that no fluid can flow therein. When the disc rotates away from the position of FIGS. 2 and 3, pipe 14 is similarly blocked by the disc. As shown in FIG. 4, the disc may be provided with a plurality of constant volume chambers 32 spaced circumferentially, each chamber being capable of alignment with pipes 14 and 22 in sequence, and the intervening solid portions of the disc being capable of blocking the pipes.

When a chamber 32 is aligned wtih pipe 14, it becomes filled with the sample material which is then permitted to flow in this pipe. As the disc rotates, the chamber is then sealed at both ends by the concentric ring sealing pads 34 which press against both sides of the disc. The chamber 32, filled with the sample, is rotated until it becomes aligned with pipe 22, to which the diluent gas is applied. When the sample volumes is in line with the diluent gas pipe, the resultant flow of this gas rinses the chamber into the mixing chamber 26 (FIG. 1), into which further diluent gas is introduced by pipe 28. A mixed and diluted sample then goes from the mixing chamber to the analyzing instrument 12.

Typically, on a one sample per second basis, where the disc 18 is one centimeter thick and the chamber 32 in the disc is 0.1 centimeter in diameter, a gaseous mass (air equivalent) of $10^{-2}$ torr liters of gas is trapped in the chamber for a sample pipe feed pressure of $10^3$ torr (20 p.s.i.). If a diluent flow of $10^3$ torr liters/sec. (one liter/sec. at 20 p.s.i.) is used to dilute the sample in the mixing chamber, the result dilution is a factor of $10^{-2}/10^3$ or $10^{-5}$. Lower diluent flow yields less dilution. More holes in the wheel increase the frequency of the sample.

Pipes 14 and 22 may be located one centimeter apart on a radius of five centimeters, for example. About thirty-one chamber apertures spaced at this distance around the disc (i.e., $2\pi r/1=31$) will yield one sample a second for a 31 second period for one revolution. Thus, the disc turns approximately two revolutions per minute. This is a slow rate which permits the use of standard mechanical sealing techniques to minimize leakage problems.

The pipe to the chemical process 10 should be short to yield current status of the sample. The pipes 14 and 22 are preferably sealed to the sealing rings 34, so that as the spring-biased rings slowly wear, the motion due to wear is taken up by the flexibility of the attached pipes. The most important sealing position is between the pipes 14 and 22, the point of heaviest sealing pressure. The diluent gas pressure can be set higher than the process chemical pressure to cause any minute residual leakage to be toward the process pipe.

Figure 5:
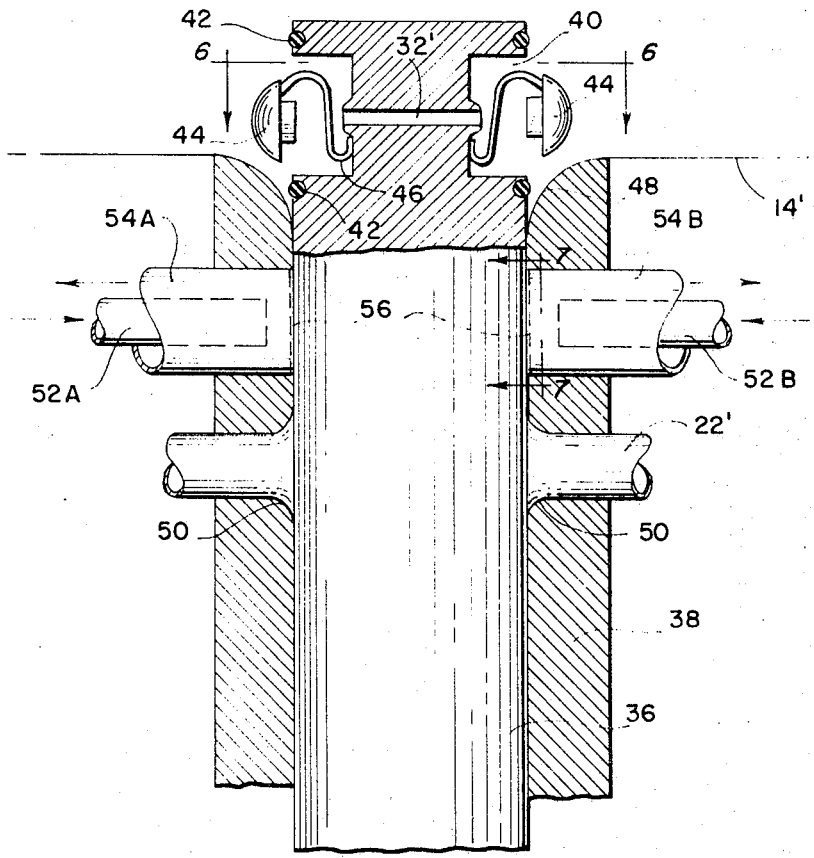
FIG. 5 is a partially sectional contracted side elevation view of a modified form of sampling mechanism.
Figure 6:
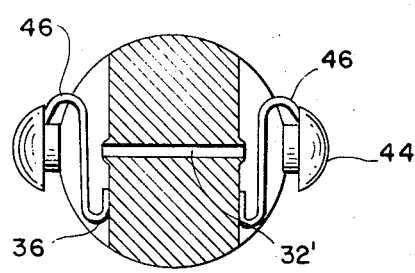
FIG. 6 is a horizontal sectional view taken along line 6—6 of FIG. 5.
Figure 7:
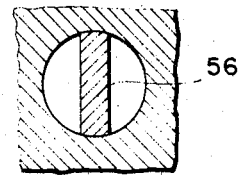
FIG. 7 is a vertical sectional view taken along line 7—7 of FIG. 5.

While the embodiment of FIGS. 1-4 has been described as a rotary sampling mechanism, it will be apparent that the disc may oscillate between pipes 14 and 22 rather than rotate continually. The embodiment of FIGS. 5-7 is an oscillating version, more specifically, a rectilinearly reciprocating version of the invention. Except where specifically designated, the system may be the same as in FIG. 1. The chemical flow process pipe is shown at 14', and the sample diluent gas pipe is shown at 22'. The sampling mechanism further comprises a suitably driven reciprocating rod or piston member 36 which slides back and forth in a close fitting guide 38. Both member 36 and guide 38 may be cylindrical. The sample chamber 32' may be formed at an undercut region 40 adjacent to one end of the member 36, sealing rings 42 being provided at opposite sides of the sampling chamber 32'. Closures in the form of end caps 44, supported on the member 36 by helical compression springs 46, are provided in the undercut region 40 adjacent to opposite ends of chamber 32'. The junction of guide 38 and pipe 14' is tapered at 48, and the outer contour of end caps 44 is curved, so that if the member 36 moves downwardly into the guide 38, end caps 44 will engage the tapered walls 48 of the guide and will be cammed inwardly against the bias of springs 46 to close the ends of chamber 32' and trap a volume of sample in the chamber. It will be noted that the sampling mechanism need not interrupt the sample pipe 14'.

Piston member 36 moves downwardly until chamber 32' is aligned with pipe 22'. Thus, the volume of sample extracted from pipe 14' by chamber 32' is placed in alignment with diluent gas pipe 22'. At this time, end caps 44, urged outwardly by springs 46 into the tapered widened mouth portions 50 of the opposed sections of pipe 22', open the chamber 32' and permit the diluent gas to flow through the chamber and extract the sample. The piston 36 should move sufficiently downward to place piston rings 42 in engagement with the walls of the guide 38 at opposite sides of the pipe 22'. When the piston member 36 reverses its direction and moves upwardly, the end caps 44 are cammed inwardly again to close volume 32' until the chamber reaches pipe 14' again.

In the preferred form of the invention shown in FIGS. 5–7, a source of rinsing gas is provided intermediate pipes 14' and 22' for cleaning the outside of piston member 36 of any sample which adheres thereto, to keep excess sample from pipe 22'. Rinsing gas is applied under pressure to pipes 52A and 52B and is removed by coaxial pipes 54A and 54B. The opposed ends of pipes 52A and 52B are spaced from the piston member 36, so that there is a constant flow of rinsing gas at opposite sides of the piston member. A septum 56 is disposed across the open end of pipes 54A and 54B adjacent to the piston member 36, so that although passage is provided for the rinsing gas to the piston member, the end caps 44 are prevented from moving outwardly as the piston member passes the rinsing gas pipes. Pipe 22' must be spaced a sufficient distance from the cleansing gas pipes so that both of the piston rings 42 are effective; otherwise there may be a momentary gas connection between the rinsing gas and instrument pipes.

The sampling chamber 32' may be 1 centimeter long by 0.1 centimeter in diameter, for example, and at known sample pressure supplies a constant mass of gaseous or liquid sample. The cycle time may be as little as a second or longer. The rates of gas flow may be adjusted appropriately. The shorter the cycle time, the faster the gas flow must be to accomplish the rinsing and flushing operations. The cap seals may be Teflon or other firm materials which resist the chemicals being sampled. The springs 46 may be of stainless steel, such as inconel, and may be spot-welded to the piston member and the caps. Fluctuation in pipe pressure, which leads to changes in sample mass, can be corrected by a pressure transducer which measures the pressure and supplies an appropriate multiplier for the analyzing instrument to provide the correct quantitative answer.

Multiple apertures in the piston member 36 can be employed for providing more samples per stroke. A double-ended device can be provided to have sampling at one end of the piston member, while the other end is flushed to the measuring instrument.

Multiple step dilution can be used in each of the disclosed embodiments. The mixing chamber would be sampled by an identical sampling mechanism, which would transfer a diluted sample to another mixing chamber for further dilution and application to the measuring instrument. Further modifications will be apparent to those skilled in the art.

The invention claimed is:

1. Sampling apparatus comprising a pair of pipes and an open-ended chamber movable between alignment with one of said pipes and alignment with the other of said pipes for extracting a sample from said one pipe and inserting it in said other pipe, said chamber having means for closing its ends as it moves between said pipes, said chamber being formed in a member which oscillates to move said chamber between said pipes repetitively, said member being supported for movement in a closely fitting guide, and said closing means being carried by said member, being spring-biased to open said chamber, and being moved by said guide to its closed position.

2. Sampling apparatus comprising a pair of pipes and an open-ended chamber movable between alignment with one of said pipes and alignment with the other of said pipes for extracting a sample from said one pipe and inserting it in said other pipe, said chamber having means for closing its ends as it moves between said pipes, said chamber being formed in a member which oscillates to move said chamber between said pipes repetitively, said member being supported for movement in a closely fitting guide, wherein said closing means comprises caps cammed toward the ends of said chamber by said guide and moving away from the ends of said chamber in said pipes.

References Cited

UNITED STATES PATENTS

| 2,973,117 | 2/1961 | Conklin. | |
| 3,064,481 | 11/1962 | Alexander. | |
| 3,080,759 | 3/1963 | McQuaid. | |
| 3,362,228 | 1/1968 | Stuben. | |
| 3,444,722 | 5/1969 | Roof | 73—23.1 |

FOREIGN PATENTS 1,097,208  12/1967  Great Britain.

S. CLEMENT SWISHER, Primary Examiner

H. C. POST III, Assistant Examiner